(12) United States Patent
Tran

(10) Patent No.: US 8,814,086 B2
(45) Date of Patent: Aug. 26, 2014

(54) ON-BOARD SUPPLY SYSTEM AND ON-BOARD GALLEY HAVING A FUEL CELL UNIT FOR USE IN AN AIRCRAFT

(75) Inventor: Trong Tran, Erlangen (DE)

(73) Assignee: Diehl Aerospace GmbH, Uberlingen (DE)

( * ) Notice: Subject to any disclaimer, the term of this patent is extended or adjusted under 35 U.S.C. 154(b) by 208 days.

(21) Appl. No.: 13/355,876

(22) Filed: Jan. 23, 2012

(65) Prior Publication Data
US 2012/0223185 A1  Sep. 6, 2012

(30) Foreign Application Priority Data
Mar. 2, 2011  (DE) .......................... 10 2011 012803

(51) Int. Cl.
*B64D 11/04*   (2006.01)

(52) U.S. Cl.
USPC ........................................ 244/118.5; 244/58

(58) Field of Classification Search
USPC .......................................... 244/58, 60, 118.5
See application file for complete search history.

(56) References Cited

U.S. PATENT DOCUMENTS

| | | | | |
|---|---|---|---|---|
| 6,551,184 | B1 * | 4/2003 | Mayer et al. ..................... | 454/76 |
| 6,834,831 | B2 * | 12/2004 | Daggett ............................ | 244/58 |
| 7,208,239 | B2 * | 4/2007 | Hoffjann et al. ................ | 429/411 |
| 7,550,866 | B2 * | 6/2009 | Breit et al. ...................... | 307/9.1 |
| 7,659,015 | B2 * | 2/2010 | Hoffjann et al. .................. | 429/9 |
| 7,731,126 | B2 * | 6/2010 | Hoffjann et al. ........... | 244/118.5 |
| 8,034,495 | B2 * | 10/2011 | Hoffjann et al. ............... | 429/414 |
| 8,203,231 | B2 * | 6/2012 | Knepple et al. ................. | 307/9.1 |
| 2001/0049041 | A1 | 12/2001 | Buchner et al. | |
| 2007/0158500 | A1 | 7/2007 | Sridhar et al. | |
| 2008/0143186 | A1 * | 6/2008 | Wisch et al. ..................... | 307/48 |
| 2009/0104493 | A1 * | 4/2009 | Metzler et al. .................. | 429/26 |
| 2010/0193629 | A1 * | 8/2010 | Breit et al. ....................... | 244/58 |
| 2011/0003224 | A1 * | 1/2011 | Scheibert ...................... | 429/434 |

FOREIGN PATENT DOCUMENTS

| | | |
|---|---|---|
| DE | 10 2004 063 304 A1 | 9/2005 |
| DE | 10 2004 058 430 A1 | 6/2006 |
| DE | 10 2007 017 820 A1 | 8/2008 |
| DE | 10 2007 054 291 A1 | 4/2009 |
| DE | 10 2008 006 742 A1 | 8/2009 |
| DE | 10 2008 062 038 A1 | 6/2010 |
| EP | 2 213 571 A2 | 8/2010 |

* cited by examiner

*Primary Examiner* — Rob Swiatek
*Assistant Examiner* — Michael Kreiner
(74) *Attorney, Agent, or Firm* — Scully, Scott, Murphy & Presser, P.C.

(57) ABSTRACT

An on-board supply system (10) for use in an aircraft comprises a fuel cell unit (20) for generating electrical energy and heat energy, and at least one consumer system (100). The fuel cell unit (20) is designed to release heat energy in the form of hot air, and the consumer system (100) is designed to absorb the electrical energy and the heat energy in the form of hot air. The fuel cell unit (20) can comprise at least one low-temperature (LT) fuel cell (30) and at least one high-temperature (HT) fuel cell (40), which can both (30, 40) be designed to be regulated to their respective operating temperature in operation by means of air cooling, and an air cooling inlet (44) of the HT fuel cell (40) can be connected in fluid communication with an air cooling outlet (36) of the LT fuel cell (30).

17 Claims, 1 Drawing Sheet

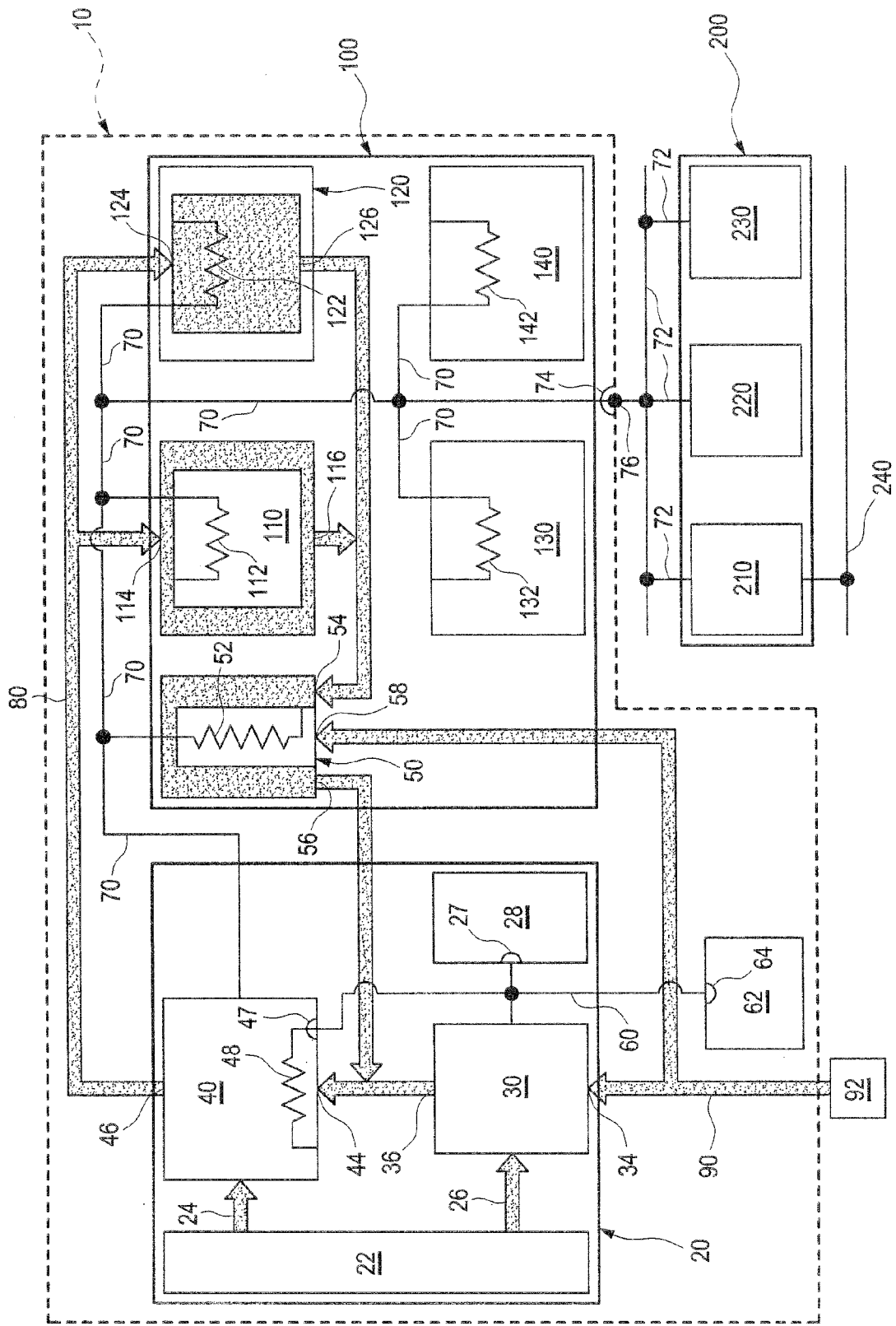

ON-BOARD SUPPLY SYSTEM AND ON-BOARD GALLEY HAVING A FUEL CELL UNIT FOR USE IN AN AIRCRAFT

BACKGROUND OF THE INVENTION

The present invention relates to an on-board supply system having a fuel cell unit for use in an aircraft, an on-board galley having a fuel cell unit for use in an aircraft, and an aircraft which is equipped with the on-board galley and/or the on-board supply system.

DISCUSSION OF THE PRIOR ART

Fuel cells are known per se and are finding increasing commercial use, e.g. in motor vehicle manufacturing. Fuel cells require a fuel, for instance hydrogen in gaseous form, and an oxidation medium, for instance oxygen in gaseous form, which burns or oxidizes the fuel under a catalytic action of an anode-cathode arrangement to form a hydrogen-containing final compound, for instance water. In the catalytically assisted combustion, an electrical voltage is produced between the anode and the cathode which is capable of driving an output current through a connected consumer of electrical energy or a load resistor. As soon as an electrical current (in the form of electrons) flows through the consumer, hydrogen ions (electrically positively charged protons) flow in the fuel cell from the anode to the cathode. As a result of the internal resistance of the fuel cell, this stream of ions is converted into thermal energy or heat energy in the fuel cell, some of the heat energy being dissipated to the outside of the fuel cell as losses.

As is generally known, the electrical power produced by the fuel cell reduces when the temperature in the fuel cell increases due to the heat energy generated therein and leaves a corresponding optimum operating temperature range of the fuel cell. It is therefore usually necessary to cool the fuel cell during operation in order to dissipate heat energy and thereby to keep the temperature in the fuel cell in its optimum operating temperature range.

In so-called PEM (Proton Exchange Membrane) fuel cells, a membrane, the so-called proton exchange membrane (PEM), which prevents a direct transfer of protons from the anode to the cathode without generating electrons, is arranged between the anode and the cathode and thereby increases the electrical power of the fuel cell. PEM fuel cells are distinguished by an operating temperature range with a relatively low temperature (approx. 60° C. to approx. 180° C.), a relatively high lifetime and a relatively low weight, and have therefore already been proposed for applications in the aircraft industry, for instance in documents DE 10 2004 058 430 A1, DE 10 2007 017 820 A1, DE 10 2007 054 291 A1, DE 10 2008 006 742 A1, DE 10 2008 062 038 A1, US 2009/0104493 A1, US 2010/0193629 A1 and EP 2 213 571 A2.

Two types of PEM fuel cell are known, so-called low-temperature (LT) and so-called high-temperature (HT) PEM fuel cells. LT PEM fuel cells work at an operating temperature of approx. 70° C. and have a very short start-up time, typically less than one second. HT PEM fuel cells work at an operating temperature of approx. 180° C. and have a higher efficiency than LT PEM fuel cells. However, they have a longer start-up time than LT PEM fuel cells and require a heater for operation in an environment at room temperature as their minimum working temperature should not be less than 80° C. For both types of fuel cell (LT PEM and HT PEM cells) the proportion of electrical energy generated in operation is approximately 35% to approximately 38%; the remaining portion of the energy produced is heat energy.

The European publication EP 2 213 571 A2 discloses a localized energy supply and consumer system for an aircraft having an on-board galley and an on-board toilet. The system comprises a fuel cell module as an energy source for generating electrical energy, heat energy and at least one by-product including water, waste heat and excess electrical energy; a plurality of consumers integrated within the on-board galley or the on-board toilet for consuming electrical energy, heat energy and the by-product; and a plurality of connecting elements for connecting the consumers in the on-board galley and the on-board toilet to the electrical energy, the heat energy and the by-product of the fuel cell module. The fuel cell module comprises a standard PEM fuel cell, a fuel module arranged adjacent to the fuel cell and optionally an additional fuel source, which is arranged remotely, for example in a luggage compartment provided beneath a floor of the aircraft cabin. Heat energy or waste heat is conducted away from the fuel cell by means of water as a heat energy carrier, for example to a water tap with hot water feed or to a hot water dispenser in the on-board galley or the on-board toilet.

SUMMARY OF THE INVENTION

According to one aspect of the present invention, the object is to provide an on-board supply system having a fuel cell unit for use in an aircraft, with which the advantageous characteristics of both types of fuel cell (LT and HT PEM cells) are used to increase a total efficiency of the system, i.e. to increase a usable proportion of the total energy generated by the system for applications or energy consumers supplied by the system.

According to a basic idea of the invention, the object is achieved in that the on-board supply system is designed to supply a consumer system with energy, the consumer system being designed to consume both the generated electrical energy and the generated heat energy. For this purpose, the consumer system can comprise first and second consumers, the first consumer being designed to consume electrical energy and the second consumer being designed to consume heat energy. The consumer system can also include third consumers which are designed to consume electrical energy and heat energy.

To achieve the objective, for use in an aircraft, an on-board supply system is provided, which comprises a fuel cell unit for generating electrical energy and heat energy, and at least one consumer system.

According to a first aspect of the invention, the fuel cell unit is designed to release heat energy in the form of hot air, and the consumer system is designed to absorb the electrical energy and the heat energy in the form of hot air. Heat energy in the form of hot air can namely have very high temperatures, for example temperatures of several hundred degrees Celsius, and therefore absorb a large amount of heat energy and at the same time be transported from the fuel cell unit to the consumer system easily and in a quickly flowing manner (i.e. without a great loss of energy). In this way, heat energy can be transported effectively from the fuel cell unit to the consumer system.

The consumer system can have at least one device for heating meals, for example contained in an on-board galley. The device for heating meals can consume the hot air and the electrical energy and can be an oven, for example a hot-air oven, designed for heating meals, or a water boiler. In this way, the hot air can be brought into direct heat-transmitting contact with the meals to be heated, for example the meals arranged in the oven, or with the water to be heated in the water boiler.

The fuel cell unit can comprise at least one low-temperature (LT) fuel cell with an operating temperature in a low-temperature (LT) range and at least one high-temperature (HT) fuel cell with an operating temperature in a high-temperature (HT) range. At the same time, the LT fuel cell can be an LT PEM fuel cell and the HT fuel cell can be an HT PEM fuel cell. Furthermore, the LT fuel cell and the HT fuel cell can be designed to be adjusted to their respective operating temperature in operation by means of air cooling, and an air cooling inlet of the HT fuel cell can be connected in fluid communication with an air cooling outlet of the LT fuel cell. In this way, the waste heat of the LT fuel cell is used as cooling air for the HT fuel cell. And if the LT and the HT fuel cell are arranged at a spatially small distance from one another, for example adjacent to one another, the energy loss in the region of the fluid communication or on the transport path between the LT and the HT fuel cell is low.

Furthermore, the LT fuel cell and the HT fuel cell can each have an air cooling inlet and an air cooling outlet, and a cooling air inlet of the LT fuel cell can be connected in fluid communication with the air outside the aircraft.

The consumer system can have a hot air inlet port and a hot air outlet port, and an air cooling outlet of the HT fuel cell can be connected in fluid communication with a hot air inlet of at least one consumer of heat energy in the form of hot air of the consumer system. Here too, when the air cooling outlet of the HT fuel cell and the hot air inlet of the heat energy consumer are arranged at a spatially close distance from one another, for example adjacent to one another, then the energy lost in the region of the fluid communication or on the transport path of the hot air dissipated by the fuel cell unit is low.

Furthermore, the on-board supply system can have a heating device which is designed to heat air to be let into an aircraft cabin during operation. The heating device can comprise a heat exchanger which is designed to transfer heat generated by the fuel cell unit in the form of hot air to the air to be let into the aircraft cabin and can comprise a gas heat exchanger for this purpose. In this embodiment, the heating device can have an air inlet which is connected in fluid communication with an air outlet of the at least one consumer of heat energy in the form of hot air of the consumer system. The hot air generated by the fuel cell unit can therefore initially be fed through the heat energy consumer and then through the heating device.

The on-board supply system can have an emergency power supply device which comprises the fuel cell unit.

In an embodiment, at least one consumer of the consumer system can be designed to absorb electrical energy in the form of direct current. In this way, the electrical energy can be fed to the consumer without the conversion losses which occur with a possible conversion of direct current to alternating current.

At least parts of the on-board supply system, in particular the fuel cell unit and the consumer system, can belong to a first on-board galley which is suitable for use in the aircraft.

In an embodiment, the consumer system can comprise at least one consumer of electrical energy and at least one consumer of heat energy in the form of hot air. In this embodiment, the on-board supply system can include a first control unit which is designed to supply the consumer of electrical energy and the consumer of heat energy with electrical energy and heat energy in the form of hot air respectively corresponding to the dynamic electrochemical balance between the electrical energy and heat energy respectively generated by the fuel cell unit.

In an embodiment which is an alternative to or can be combined with the embodiment previously described, the consumer system can comprise two or more consumers of electrical energy. At the same time, the on-board supply system can include a second control unit which is designed to feed the electrical energy generated by the fuel cell unit to the two or more consumers time-shifted with respect to one another. In this way, it is not necessary for the output power of the fuel cell unit to be rated according to the total of the consumption powers of the consumers, it being enough when the output power is rated sufficiently greater than the highest individual consumption power of the consumer with the highest power consumption. In this embodiment, the second control unit can be designed to feed the electrical energy emitted by the fuel cell unit to the two or more consumers in accordance with predetermined priorities which are assigned to the respective consumers and time-shifted with respect to one another according to predetermined rules.

The on-board supply system can have a DC high-voltage bus system which connects the current output of the HT fuel cell to the two or more consumers of electrical energy of the consumer system in an electrically conducting manner.

To achieve the object, an aircraft is also provided in which at least two on-board supply systems according to one of the embodiments described above according to the first aspect of the invention, and/or at least two on-board galleys each of which includes an on-board supply system according to one of the embodiments described above according to the first aspect are provided. This guarantees a redundancy for the on-board supply system according to the first aspect and for an emergency power supply device which includes the on-board supply system.

A conventional emergency power supply system with a static inverter, a conventional emergency power supply unit and a conventional alternating current (AC) emergency power bus system can also be provided in the aircraft. As an option, the emergency power supply system can also include one or more accumulators for storing or buffering electrical energy. At the same time, the conventional emergency power supply system can be connected to the DC high-voltage bus system of the on-board supply system via a DC emergency power bus system in an electrically conducting manner. The electrically conducting connection between the DC high-voltage bus system and the DC emergency power bus system can be designed as a disconnectable connection, in particular between a first bus connection element of the DC high-voltage bus system of the on-board supply system and a second bus connection element of the DC emergency power bus system of the conventional emergency power supply system. With the disconnectable connection, the first bus connection element can have a multi-pole plug and the second bus connection element a multi-pole coupling or vice versa the first bus connection element can have a multi-pole coupling and the second bus connection element a multi-pole plug.

The static inverter of the conventional emergency power supply system can be arranged between the AC emergency power bus system and the DC emergency power bus system and be designed to convert the alternating voltage and the alternating current in the conventional AC emergency power bus system into the direct voltage and direct current of the DC emergency power bus system.

The on-board supply system can include a fuel reservoir, in particular a hydrogen gas reservoir. The fuel reservoir can be designed as a pressurized gas tank. Further, it can be arranged integrated into the on-board supply system or into the on-board galley. Alternatively, the fuel reservoir can be arranged spatially separated from the on-board supply system, for example outside the aircraft cabin, in particular in a luggage compartment of the aircraft.

BRIEF DESCRIPTION OF THE DRAWINGS

The invention is described in further detail below by way of example with reference to an embodiment shown in the attached FIGURE.

FIG. 1 shows an embodiment of an on-board supply system having a fuel cell unit and a consumer system according to the first aspect of the invention, the on-board supply system being designed as part of an on-board galley and in electrically conducting contact with a conventional emergency power supply system.

DETAILED DESCRIPTION OF THE INVENTION

The on-board supply system 10 shown in FIG. 1 comprises a fuel cell unit 20, a consumer system 100, a fuel reservoir 22 and a fuel cell control unit 28. The fuel cell unit 20 comprises a low-temperature (LT) fuel cell 30 with an air cooling inlet 34 and an air cooling outlet 36, and a high-temperature (HT) fuel cell 40 with an air cooling inlet 44 and an air cooling outlet 46. The LT and the HT fuel cells 30, 40 are designed as proton exchange or PEM (Proton Exchange Membrane) fuel cells.

The consumer system 100 comprises a heating device 50 for heating the outside air 92 in an aircraft cabin, a hot water dispenser as a first consumer 110 of electrical energy and heat energy, a hot-air oven as a second consumer 120 of electrical energy and heat energy, a coffee machine as a third consumer 130 of exclusively electrical energy, and a microwave unit as a fourth consumer 140 of exclusively electrical energy.

The LT fuel cell 30 has a fuel inlet 26 and the HT fuel cell 40 a fuel inlet 24 to which fuel in the form of hydrogen gas is fed from the fuel reservoir 22. Furthermore, the LT fuel cell 30 has an oxidation medium inlet or air cooling inlet 34 which is connected by means of an outside air feed system 90 in fluid communication with the outside air 92, in particular with the outside air 92 which is cold under flight conditions, as an oxidation medium so that the outside air 92 is also fed to the LT fuel cell 30 for air cooling. In order to guarantee an adequate feed of outside air 92 as oxidation medium and as air cooling medium, a fan or blower device (not shown), which feeds a multiple of the necessary air quantity for the pure oxidation medium supply of the fuel cell 30 to the fuel cell 30, is provided upstream relative to the air cooling inlet 34.

The outside air 92 is fed by means of an outside air feed system 90 of the aircraft to the LT fuel cell 30 (to the air cooling inlet 34) and to the heating device 50 (to a feed air inlet 58).

The air cooling outlet 36 of the LT fuel cell 30 is connected in fluid communication with the air cooling and oxidation medium inlet 44 of the HT fuel cell 40. In this way, the air which is heated by the heat energy generated in the LT fuel cell 30 is fed to the HT fuel cell 40 as oxidation medium and as cooling air.

A direct current (DC) high-voltage bus 70 is used to transmit or distribute the electrical energy generated by the fuel cell unit 20 to the consumers 110, 120, 130, 140 of electrical energy, i.e. the bus system 70 provides the necessary electrically conducting connection between the fuel cell unit 20 and the consumer system 100 for transmitting the generated electrical energy.

A hot air pipe bus system 80 is used to transmit or distribute the thermal energy or heat energy in the form of hot air generated by the fuel cell unit 20 to the consumers 110, 120 of heat energy and electrical energy, i.e. the bus system 70 provides the necessary hot air transmission line between the fuel cell unit 20 and the consumer system 100 for transmitting the generated heat energy in the form of hot air. For this purpose, the hot air pipe bus system 80 is connected in fluid communication with the air outlet or air cooling outlet 46 of the HT fuel cell 40 and with the hot air inlets 114, 124 of the consumers 110, 120 of the consumer system 100. The hot air pipe bus system 80 feeds the hot air escaping from the air cooling outlet 46 of the HT fuel cell 40 through the hot air inlet 114 to the hot water dispenser (as the first consumer 110) and, effectively in parallel with this, through the hot air inlet 124 to the hot-air oven (as the second consumer 120). The hot water dispenser (the first consumer 110) consumes the heat energy in the form of hot air fed from the hot air pipe bus system 80 to heat water. The hot-air oven (the second consumer 120) consumes heat energy in the form of hot air to heat meals placed in the oven. The still relatively hot air flowing out of an air outlet 116 of the hot water dispenser (first consumer 110) and out of an air outlet 126 of the hot-air oven (second consumer 120) is fed to the heating device 50 through its hot air inlet 54, and is additionally used to release heat energy to the fresh air to be fed to and heat the aircraft cabin in the heating device 50 by means of a gas heat exchanger (not shown) contained therein.

The heating device 50 is used to heat the fresh air (outside air 92) to be fed to the aircraft cabin to room temperature. For this purpose, the heating device 50 has a gas heat exchanger (not shown) for heating the fresh air (outside air 92) to be fed to the aircraft cabin by means of the still relatively hot air released by the consumers 110 and 120, and an electrical heating device 52 which is arranged in the flow of fresh air and has an electrical load resistor for additionally heating the flow of fresh air (outside air 92). After flowing through the gas heat exchanger, the warm air which is fed to the gas heat exchanger of the heating device 50 through the air inlet 54 is released through an air outlet 56 and is also fed to the air inlet 44 of the HT fuel cell 40 via a warm air pipe.

The fuel cell unit 20 also comprises an internal fuel cell control unit 28 for controlling the fuel cells 30 and 40, and an internal low-voltage DC bus 60 which is used to control the cells 30 and 40 via the control unit 28 and is in electrically conducting communication with a current output of the LT fuel cell 30, a control input/output 27 of the control unit 28, a power input 47 of the HT fuel cell 40 and a power input 64 of an electrical storage device (or accumulator) 62.

The fuel cell unit 20 has an accumulator device 62 for the intermediate storage or buffering of excess DC low-voltage energy which is generated by the LT fuel cell before the buffered energy is fed to the HT fuel cell 40 for heating purposes. In particular, the control unit 28 includes a control device (not shown) for regulating the DC low voltage provided in the low-voltage DC bus 60 or the electrical current available therein. An excess part of the electrical output power generated by the LT fuel cell 30 can be fed via the low-voltage DC bus 60 under control of the control unit 28 to the accumulator device 62 and buffered therein.

Under control of the control unit 28, another part of the electrical output power generated by the LT fuel cell 30 and, if possible, part of the power (electrical energy) stored in the accumulator device 62 is fed via the low-voltage DC bus 60 and the power input 47 to an electrical heating device 48 in the HT fuel cell 40 in order to heat the HT fuel cell 40 to its increased operating temperature. This takes place in addition to the heat energy generated in the LT fuel cell 30 which is fed to the HT fuel cell 40 in the form of warm air via its air cooling inlet 44.

In the fuel cell unit 20, the LT fuel cell 30 is used to maintain the HT fuel cell 40 at its minimum operating temperature, to supply the internal control and signal electronics of the on-board supply system 10 and/or those of the on-board galley and any (internal in the case of the fuel cell unit 20) local consumers and the control unit 28 with electrical energy, and to provide temporarily excessively generated electrical energy (in the form of direct voltage direct current) in the accumulator device 62 for buffering. The output power of the LT fuel cell in operation is approximately 10% to 20% of the output power of the HT fuel cell 40. In line with the relatively lower output power of the LT fuel cell 30, the output voltage of the fuel cell 30 also lies below the touchable voltage of approximately 60 V (DC). Additional outlay for the electrical insulation of the low-voltage DC bus 60 and all elements which are in electrically conducting contact therewith is therefore unnecessary.

The DC high-voltage bus 70 feeds the electrical power (in the form of a DC high voltage and a DC current) output by the HT fuel cell 40 to the consumers 110, 120, 130 and 140 of the consumer system 100 which consume electrical energy. The consumers of electrical energy include the hot water dispenser (first consumer 110), which has an electrical heating device with a load resistor 112 for the (additional with regard to the heat energy feed) heating of the water, the hot-air oven (second consumer 120), which has an electrical heating device with a load resistor 122 for heating the interior volume of the oven in addition to the heat energy in the form of hot air generated by the HT fuel cell 40 which is fed through the air inlet 124 via the hot air pipe bus 80, the coffee machine (third consumer 130), which likewise has an electrical heating device with a load resistor 132, and finally the microwave unit (fourth consumer 140) which has an electrically operated microwave generator with a load resistor 142.

The first, second, third and fourth consumer 110, 120, 130 and 140 respectively is in each case suitable for direct voltage, enabling them to directly consume the DC current generated by the fuel cell unit 20 and enabling an expenditure or power loss for the respective conversion into alternating voltage to be consumed by the consumers to be saved.

In a conventionally operated fuel cell or PEM fuel cell which is supplied with air as the oxidation medium, the discharged air is theoretically free, and in practice nearly free, of oxygen. However, as a result of the fan or blower unit (not shown) which is provided upstream (of the air cooling inlet 34 of the LT fuel cell 30) of the fuel cell unit 20, a multiple of the quantity of air required for feeding the oxidation medium to the fuel cells 30 and 40 is conveyed or fed so that the discharged air of the HT fuel cell 40 of the fuel cell unit 20 has practically the same oxygen content as the outside air 92. A power reduction in the fuel cells 30 and 40 is therefore not to be expected. An increase in efficiency of the LT and HT fuel cells 30, 40 of up to 80% is possible as a result of the forced air feed by means of the ventilation or blower unit.

A totaled power requirement of the on-board galley equipment (i.e. of the first, second, third and fourth consumer 110, 120, 130, 140) would be relatively high, and for the consumers commonly found in aircraft or their power consumptions is approximately 20 kW.

This power consumption mentioned above would apply for the case where all consumers (i.e. the first to fourth consumer 110 to 140) are required to consume power at the same time. However, the required power consumption does not have to be supplied entirely in the form of electrical output power of the HT fuel cell 40. On the one hand, output power of the HT fuel cell 40 can also be consumed in the form of heat energy in the form of hot air by the first and second consumers 110 and 120 which are designed for consuming both electrical energy and heat energy. On the other hand, the maximum required power consumption of the consumers is further reduced in that the consumers of electrical energy 110, 120, 130 and 140 are assigned a device-specific priority and that the required electrical power is fed to the consumers of electrical energy 110 to 140 time-shifted with respect to one another controlled by a first intelligent control unit (not shown) in accordance with the priority assigned to them and in accordance with predefined rules. With a device management system optimized in accordance with the priorities and the predefined rules, a reduction in the electrical output power to be provided by the fuel cell unit 20 (in particular by the HT fuel cell 40) of approximately 3.5 kW is possible for the consumers usually found in an on-board galley (water heating device 110, hot-air oven 120, coffee machine 130 and microwave device 140).

As the waste heat of the fuel cells 30 and 40 is only produced when the fuel cells 30 and 40 respectively also generate electrical energy, two energy forms which are dependent on one another, electrical energy and heat energy in the form of hot air, are generated simultaneously in the fuel cells 30 and 40. Accordingly, by means of a second intelligent controller, realized by a second control unit (not shown), the consumers 110, 120, 130 and 140 are controlled so that the balance between the electrical energy generated in the fuel cells 30 and 40 and the heat energy generated corresponds to the dynamic electrochemical balance during the operation of the fuel cells 30 and 40.

As can be seen from the above description of the first to fourth consumer 110, 120, 130, 140, the fuel cell unit 20 together with the consumer system 100 forms an integral part of an on-board galley. In an aircraft, for reasons of design, on-board galleys are positioned by the exits and, if necessary, also by emergency exits. Also, at least two on-board galleys are usually provided in an aircraft. It is therefore expedient that the fuel cell unit 20 also undertakes tasks of an emergency power supply. As at least two on-board galleys and therefore at least two fuel cell units 20 are provided in an aircraft, a redundancy (with regard to the fuel cell units 20) is guaranteed for such an emergency power supply. Therefore, in principle, a conventional emergency power supply with conventional emergency power generation devices with associated chargeable batteries or accumulators can be dispensed with.

However, in the embodiment shown in FIG. 1, a conventional emergency power supply device 200 is provided to afford additional redundancy. In the embodiment shown in FIG. 1, the conventional emergency power supply system 200 comprises a static inverter 210, a conventional emergency power supply unit (EPSU) 220 and an accumulator 230. On the one hand, the static inverter 210 is connected to the direct current (DC) emergency supply bus system 72 and, on the other, to an alternating current (AC) emergency supply bus system 240 which is supplied from the emergency power supply system 200 and changes or converts the alternating voltage provided by the conventional emergency power supply system 200 in the AC emergency supply bus system 240 into a direct voltage and direct current with the current and voltage relationships respectively available in the DC emergency supply bus system 72.

The DC high-voltage bus 70 of the on-board supply system 10 is in electrically conducting contact with the external direct current (DC) emergency power bus system 72 by means of a first bus connecting element 74 which can be designed as a multi-pole socket. The DC emergency power bus system 72, which is external with respect to the on-board supply system 10, has a second bus connecting element 76 which is designed to be complementary (that is to say as a plug or socket respectively) to the first bus connecting element 74 of the on-board supply system 10 to provide the electrically conducting connection to the direct current (DC) high-voltage bus system 70 of the on-board supply system 10 via the element 74. The DC emergency power bus system 72 provides an (electrically conducting) connection between the (direct current (DC) high-voltage bus system 70 of the) on-board supply system 10 and the conventional emergency power supply system 200.

In an emergency situation which is associated with the failure of conventional power supply units such as prime-mover-driven generators, emergency power supply units 220, APU and RAT, the electrical energy generated by the at least two fuel cell units 20 provided on board is available for the emergency power supply. Conventionally, the energy required in emergency situations is provided by batteries or accumulators. Due to the heavy weight of batteries and accumulators, these can now be made smaller and a weight saving is thereby achieved. In order to enable batteries or accumulators to be completely dispensed with in the emergency power supply units 220, the fuel cell unit 20 can be rated so that the emergency current required for the consumer system 100 and the on-board galley and that required in the event of an emergency landing is calculated in advance and is taken into account when rating the electrical output power of the (two or more) fuel cell units 20 and the storage volume of the fuel reservoir 22.

Conventional on-board galleys are supplied with electrical power by generators coupled to the prime movers. The cable connections between the prime-mover generators and the on-board galley or its consumers required for this are relatively weight-intensive on account of the large cable cross sections necessary. In the on-board supply system 10 shown in FIG. 1, the energy supply system, i.e. the fuel cell unit 20, is arranged independently and in the immediate vicinity of the consumer system 100 (the electrical consumers 110, 120, 130 and 140). The electrical connections, i.e. the DC high-voltage bus system 70 and the low-voltage DC bus 60 are therefore comparatively short and are comparatively light in weight, so that a further weight reduction for the aircraft is achieved compared with a conventional power generation from prime-mover generators.

In the event of a loss of cabin pressure, the oxygen content of the outside air which can be fed to the fuel cell unit 20 and therefore also the power of the fuel cells 30 and 40 reduces. At a cruising altitude of 50,000 feet, for example, the fuel cells 30, 40 will only provide approximately 20% of their rated power corresponding to the usual oxygen content of outside air at cruising altitude. The fuel cell unit 20 is rated so that the electrical output power provided by the HT fuel cell 40 in conjunction with the two or more fuel cell units 20 provided on board (or the two or more HT fuel cells 40 available) is sufficient for emergency operation.

LIST OF REFERENCES

10 On-board supply system
20 Fuel cell unit
22 Fuel reservoir
24 First fuel feed
26 Second fuel feed
30 LT fuel cell
34 Air cooling inlet
36 Air cooling outlet
40 HT fuel cell
44 Air cooling inlet
46 Air cooling outlet
50 Heating device
52 Electrical heater or load resistor
54 Air inlet
56 Air outlet
58 Feed air inlet
60 Low-voltage DC bus
62 Accumulator device
64 Power input
70 Direct current (DC) high-voltage bus system
72 Direct current (DC) emergency power bus system
74 First bus connecting element
76 Second bus connecting element
80 Hot air pipe bus system
90 Outside air feed system
92 Outside air
100 Consumer system
110 First consumer of heat energy and electrical energy
112 Electrical heating device or load resistor
114 Air inlet
116 Air outlet
120 Second consumer of heat energy and electrical energy
122 Electrical heating device or load resistor
124 Air inlet
126 Air outlet
130 Third consumer of electrical energy
132 Electrical heating device or load resistor
140 Fourth consumer of electrical energy
142 Microwave generator or load resistor
200 Emergency power supply system
210 Static inverter
220 Emergency power supply unit
230 Accumulator
240 Alternating current (AC) emergency power bus system

What is claimed is:

1. An on-board supply system for use in an aircraft, comprising:
a fuel cell unit for generating electrical energy and heat energy,
at least one consumer system,
the fuel cell unit configured to release heat energy in the form of hot air, and
the at least one consumer system configured to absorb the electrical energy and the heat energy in the form of hot air,
wherein the fuel cell unit comprises at least one low-temperature (LT) fuel cell and at least one high-temperature (HT) fuel cell, the at least one LT fuel cell and the at least one HT fuel cell are configured to be regulated to the respective operating temperature in operation by means of air cooling, and an air cooling outlet of the at least one LT fuel cell is connected in direct fluid communication with an air cooling inlet of the at least one HT fuel cell,
a hot air pipe bus system configured to guide hot air from the at least one HT fuel cell to the at least one consumer system, and
a fan disposed upstream of an air cooling inlet of the at least one LT fuel cell, for conveying air required for feeding an oxidation medium to the at least one LT fuel cell and the at least one HT fuel cell, such that the discharged air of the at least one HT fuel cell has substantially the same oxygen content as air outside of the aircraft.

2. The on-board supply system according to claim 1, wherein an air cooling outlet of the at least one HT fuel cell is connected in fluid communication with a hot air inlet of at least one consumer of heat energy of the at least one consumer system.

3. The on-board supply system according to claim 1, wherein the cooling air inlet of the at least one LT fuel cell is connected in fluid communication with the air outside the aircraft.

4. The on-board supply system according to claim 2, further comprising a heating device which is configured to heat air to be fed into an aircraft cabin during operation.

5. The on-board supply system according to claim 4, wherein the heating device has an air inlet which is connected in fluid communication with an air outlet of the at least one consumer of heat energy of the at least one consumer system.

6. The on-board supply system according to claim 1, further comprising an emergency power supply device which comprises the fuel cell unit of the on-board supply system.

7. The on-board supply system according to claim 1, wherein at least one consumer of the at least one consumer system is configured to absorb electrical energy in the form of direct current.

8. The on-board supply system according to claim 1, wherein the fuel cell unit and the at least one consumer system belong to a first on-board galley for use in the aircraft.

9. The on-board supply system according to claim 1,
wherein the at least one consumer system comprises at least one consumer of electrical energy and at least one consumer of heat energy in the form of hot air, and
wherein the on-board supply system comprises a first control unit which is configured to supply the consumer of electrical energy and the consumer of heat energy with electrical energy and heat energy in the form of hot air, respectively, such that the balance between the electrical energy and the heat energy corresponds to the dynamic electrochemical balance during the operation of the fuel cell unit.

10. The on-board supply system according to claim 9, wherein the at least one consumer system comprises two or more consumers of electrical energy, and the on-board supply system includes a second control unit which is configured to feed the electrical energy generated by the fuel cell unit to the two or more consumers time-shifted with respect to one another.

11. The on-board supply system according to claim 10, wherein the second control unit is configured to feed the electrical energy emitted by the fuel cell unit to the two or more consumers in accordance with predetermined priorities which are assigned to the respective consumers and time-shifted with respect to one another according to predetermined rules relating to the supply of the consumers.

12. The on-board supply system according to claim 1, further comprising a DC high-voltage bus system which connects the current output of the HT fuel cell to the two or more consumers of electrical energy of the consumer system in an electrically conducting manner.

13. An aircraft comprising at least two on-board supply systems according to claim 1.

14. The aircraft according to claim 13, further comprising at least two on-board galleys each of which includes said on-board supply system.

15. The aircraft according to claim 13, further comprising a conventional emergency power supply system with an electrical component, a conventional emergency power supply unit and a conventional alternating current (AC) emergency power bus system.

16. The aircraft according to claim 15, wherein the conventional emergency power supply system is connected to a DC high-voltage bus system of the on-board supply system via a DC emergency power bus system in an electrically conducting manner.

17. The aircraft according to claim 16, wherein the an electrical component is arranged between the conventional AC emergency power bus system and the DC emergency power bus system and is configured to convert the alternating voltage and the alternating current in the conventional AC emergency power bus system into the direct voltage and direct current of the DC emergency power bus system.

* * * * *